US008566419B2

(12) United States Patent
Purdy et al.

(10) Patent No.: US 8,566,419 B2
(45) Date of Patent: Oct. 22, 2013

(54) SYSTEMS AND METHODS FOR ENHANCED USER COMMUNICATIONS (75) Inventors: Thomas Jeffrey Purdy, Springville, UT (US); David Randal Elkington, Springville, UT (US); Matthew Coston Parker, Spanish Fork, UT (US)

(73) Assignee: InsideSales.com, Provo, UT (US)

( * ) Notice: Subject to any disclaimer, the term of this patent is extended or adjusted under 35 U.S.C. 154(b) by 848 days.

(21) Appl. No.: 11/955,149

(22) Filed: Dec. 12, 2007

(65) Prior Publication Data

US 2009/0154686 A1 Jun. 18, 2009

(51) Int. Cl.
G06F 15/16 (2006.01)
(52) U.S. Cl.
USPC .............................. 709/217; 709/204; 709/227
(58) Field of Classification Search
USPC ......... 709/217, 203, 218, 219, 223, 224, 226, 709/227; 379/265.09, 900
See application file for complete search history.

(56) References Cited

U.S. PATENT DOCUMENTS

| 2002/0122541 | A1* | 9/2002 | Metcalf ...................... 379/88.02 |
| 2005/0172232 | A1* | 8/2005 | Wiseman ...................... 715/718 |
| 2007/0005776 | A1* | 1/2007 | Hansen et al. ................ 709/227 |
| 2007/0250841 | A1* | 10/2007 | Scahill et al. ................. 719/320 |
| 2008/0313277 | A1* | 12/2008 | Altberg et al. ................ 709/204 |
| 2009/0240561 | A1* | 9/2009 | Altberg et al. ................. 705/10 |

* cited by examiner

Primary Examiner — Barbara Burgess
(74) Attorney, Agent, or Firm — Echelon IP LLC; Everett D. Robinson (57) ABSTRACT Disclosed herein are systems and associated methods for operating web interactive services in conjunction with communication services, linking the communication with the interaction by means of a session-specific identifier such as a telephone number. During the course of a web session, user interaction information may be collected, that information potentially indicating subjects of interest to a user associated with the session-specific identifier. In the event the user uses the identifier make a contact regarding the information, the identifier can be used to associate the interaction information and subjects of interest, such that the contact may have that information and those subjects available to assist a user making contact. Interaction and subject information may also be used to customize the interaction with a contacting user with regard to the routing of a telephone call, a greeting, a product or service offering, or other communication.

23 Claims, 6 Drawing Sheets

Contact Us

|  | Phone | Email |
|---|---|---|
| White Paper | 1-800-555-1212 ext. 3271 | whitepaper327@insidesales.com |
| Free Trial | 1-800-555-1212 ext. 3272 | freetrial327@insidesales.com |
| Customer Support | 1-800-555-1212 ext. 3273 | support327@insidesales.com |
| Sales | 1-800-555-1212 ext. 3274 | sales327@insidesales.com |

SYSTEMS AND METHODS FOR ENHANCED USER COMMUNICATIONS

BACKGROUND OF THE INVENTION

1. Field of the Invention

This invention relates generally to mapping web site interaction data to user communications and more particularly relates to means and methods for leveraging web site interaction data in responding to user communications.

2. Description of the Related Art

Enterprises often have web pages where users can browse and view information related to their interests and needs. Such browsing may generate user initiated communication. However, enterprises are typically unaware of the interests and needs of a particular user when responding to user communications. In particular, enterprises have not had the ability to relate user communications to a user's web site interaction data.

SUMMARY OF THE INVENTION

The present invention has been developed in response to the present state of the art, and in particular, in response to the problems and needs in the art that have not yet been fully solved by currently available communication response and tracking systems and methods. Accordingly, the present invention has been developed to provide systems and methods for relating web site interaction data to user communications and optimizing responses to user communications that overcome shortcomings in the art.

In one aspect of certain embodiments of the present invention, a system to enhance communications with a user includes a web server that provides a web page to a user and collects web site interaction data during at least one browsing session. The web page may include a session-specific response address or response code that enables the system to associate web site interaction data with communications from the user. The response address may be a telephone number, email address, text messaging address, instant messaging address, or the like. In certain embodiments, the session-specific response address or code may be service-specific. For example, a response address for customer support may be different than a response address for the sales department.

The communication server may associate the communication from the user with the web site interaction data and select or adjust interaction with the user according to the web site interaction data. For example, the system may select or adjust a particular action such as routing the communication, providing a greeting to the user, selecting an ACD plan, selecting an IVR menu, offering a product to the user, offering a service to the user, conducting a survey, communicating a particular message to the user, and presenting user related data to an agent, based on the web site interaction data.

In another aspect of certain embodiments of the present invention, a method to enhance responses to user communications includes receiving a communication from a user via a session-specific response address that was provided to the user via a web page, and associating the communication with the user with web site interaction data collected for the user during one or more browsing sessions in which the user visited the web page. The method may also include selecting or adjusting interaction with the user according to the web site interaction data. The selected or adjusted interaction may include routing the communication from the user, selecting a response message, providing a greeting to the user, selecting an ACD plan, selecting an IVR menu, offering a product to the user, offering a service to the user, and conducting a survey.

The method may also include serving a web page with the session-specific response address or response code included within the web page. The session-specific response address may be a telephone number (which may include an extension number), an email address, a text-messaging address, an instant messaging address, or the like. The session-specific response code may be a session-identifier, a user identifier, or the like. The session-specific response address or response code may be returned to an available pool upon completion of the current browsing session and any associated communications with the user.

In certain embodiments, the method includes retrieving additional data for the user such as reverse lookup data, credit check data, web site data, web site rank information, do-not-call registry data, data from a CRM database, and background check data.

In another aspect of certain embodiments of the present invention, a method to provide enhanced user data includes receiving web site interaction data for a user collected during one or more browsing sessions in which the user visited a web page, and receiving user-specific data collected in conjunction with one or more communications by the user to a session-specific response address. The session-specific response address may be provided to the user via the web page during the session in which the user visits the web page. The method may further include merging the user-specific data with the web site interaction data to provide enhanced user data, and storing the enhanced user data. In one embodiment, the session specific response address is a telephone number.

The methods described herein may be embodied as a computer program product or computer readable medium bearing computer usable program codes executable to perform operations to accomplish the described methods. It should also be noted that references throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium or computer-readable medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
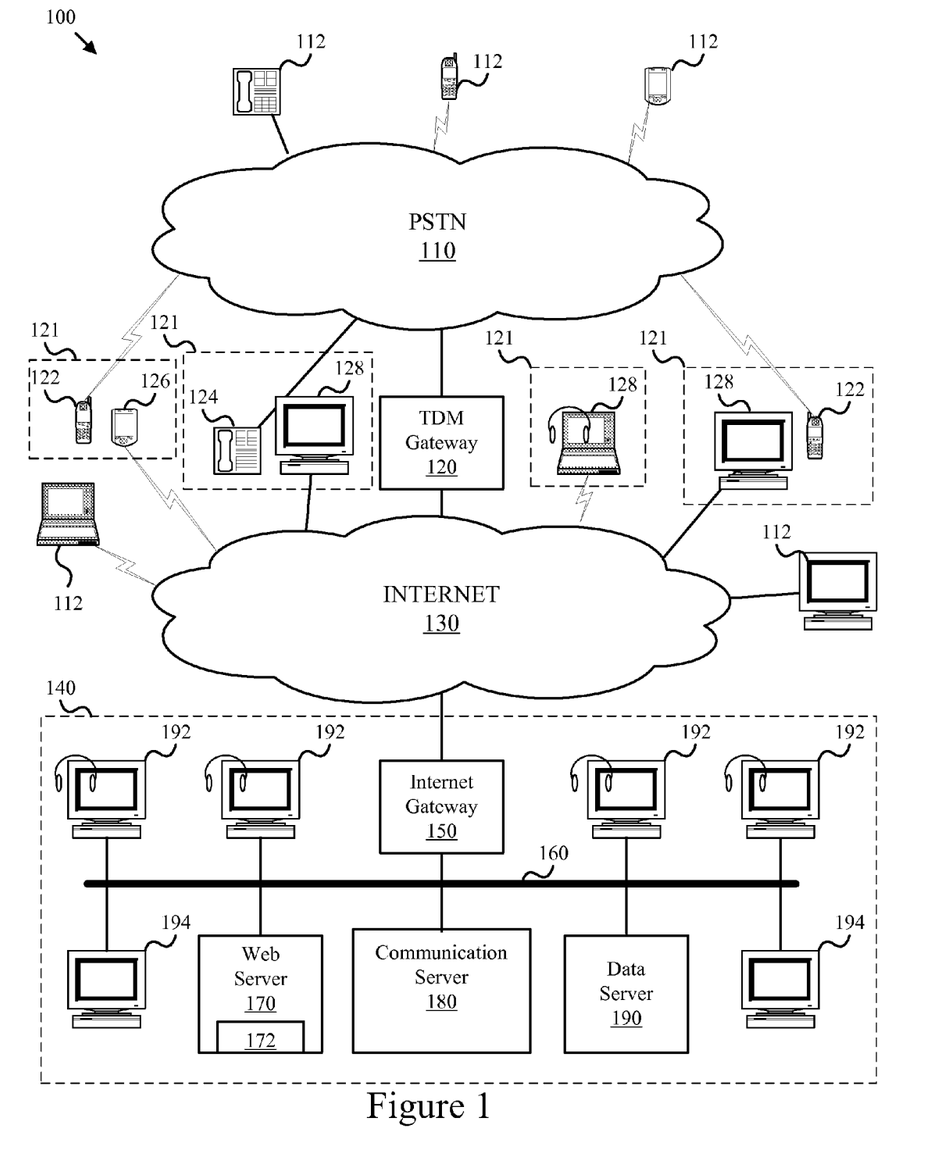
FIG. 1 is a schematic block diagram illustrating one embodiment of a communication system in accordance with the present invention.

FIG. 1 is a schematic block diagram illustrating one particular embodiment of a communication system 100 in accordance with the present invention. As depicted, the communication system 100 includes various components such as a public switched telephone network (PSTN) 110, user communication and/or computing devices 112, a TDM gateway 120 connecting the PSTN to an internet 130, remote agent stations 121, workstations 128, a call center 140, an internet gateway 150 connecting a local area network 160 to the internet 130, and various servers such as a web server 170, a response server 180, and a data server 190, local agent workstations 192, and control workstations 194. In certain embodiments, the system 100 may also include an analytics server (not shown) that analyzes user interactions with websites, IVR menus, and the like, and assesses the user's needs and interests. The particular embodiment 100 is one example of components that can be operably interconnected to provide a communication response system wherein the components function collaboratively to improve response success rates.

In the depicted embodiment, the remote agent stations 121 include wireless phones 122, wired phones 124, wireless computing devices 126, and workstations 128. In certain embodiments, the wireless phones 122 or the wired phones 124 may be VOIP phones. In some embodiments, the computing devices 126 or the workstation 128 may be equipped with a soft phone. The remote agent stations 121 enable agents to provide services from remote locations similar to agents stationed at the workstations 192 and directly connected to the local area network 160.

In one embodiment, the local area network 160 resides within a call center 140 that uses VoIP and other messaging services to communicate with users connected to the PSTN 110 and/or the internet 130. The various servers in the call center 140 function cooperatively to receive communications from users, provide customer data to agents via agent terminals such as the local agent workstations 192 and the remote agent stations 121, and connect the agents to the users. The users may be connected to the PSTN 110, the internet 130, or the like.

The web server 170 may provide one or more web forms 172 to users via browser displayable web pages. The web forms may be displayed to the users via a variety of communication and/or computing devices 112 including phones, laptop computers, desktop computers, media players, and the like that are equipped with a browser. In the depicted embodiment, the web forms 172 provide a session-specific response address or response code to the user that enables the communication system 100 to identify the user and associate web site interaction data collected during a during one or more browsing sessions in which the user visits the web page. The response address may be a telephone number.

The communication server 180 may associate communication from the user with the web site interaction data. In one embodiment, communication to the session-specific response address is automatically associated with the user. In another embodiment, the user provides a session-specific response code that enables the communication server to associate communication from the user with the web site interaction data.

The communication server may select or adjust interactions with the user based on the web site interaction data. In one embodiment, the communication server 180 selects a response plan to user communications based on the web site interaction data. The response plan may include initiating a variety of actions such as routing the telephone call, providing a greeting to the user, selecting an IVR menu, offering a product to the user, offering a service to the user, conducting a survey, communicating a particular message to the user, and presenting user related data to an agent.

The communication server 180 or the like, may deliver information on the user to an agent to enable the agent to achieve a particular objective such as establishing a relationship with the user, thanking the user for their interest in a product, answering questions from the user, informing the user of a product or service offering, selling a product or service, surveying the user on their needs and preferences, and providing support to the user. The communication server 180 may deliver the information to the agent using a variety of delivery services such as email services, instant messaging services, short message services, enhanced messaging services, text messaging services, telephony-based text-to-speech services, and multimedia delivery services. The agent terminals 121 or 192 may visually or sonically present the information on the user and enable the agent to communicate with the user.

The data server 190 or the like may retrieve additional data associated with the user such as additional web analytics data, reverse lookup data, credit check data, web site data, web site rank information, do-not-call registry data, data from a CRM database, and background check data. The data server may store the collected data in a datastore and associate the user data with web site interaction data provided by the web server 170, a third party analytics service, or the like.

Figure 2:
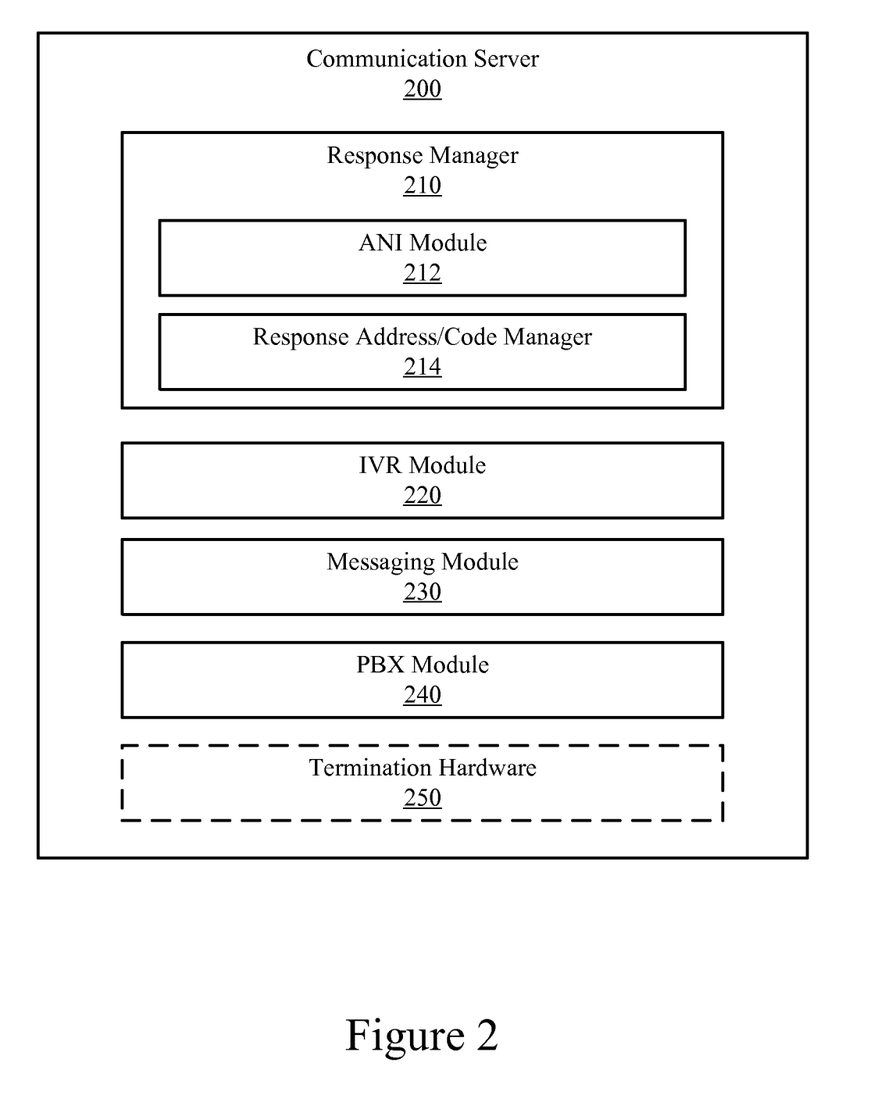
FIG. 2 is a schematic block diagram illustrating one embodiment of a communication server in accordance with the present invention.

FIG. 2 is a schematic block diagram illustrating one embodiment of a communication server 200 in accordance with the present invention. As depicted, the communication server 200 includes a response manager 210, an IVR module 220, a messaging module 230, a PBX module 240, and termination hardware 250. The response server 200 enables an agent to communicate with a user in conjunction with a response plan. The response server 200 is one example of the response server 180 depicted in FIG. 1.

The response manager 210 responds to user communications. In one embodiment, responses occur according to a response plan. The response manager 210 may respond to user communications via the IVR module 220, the messaging module 230, or the like. The IVR module 220 enables interactive communications with a user without requiring agent interaction. In one embodiment, the response manager 210 directs the IVR module 220 to provide a selected menu to the user. The messaging module 230 sends and receives messages to agents and users. The messaging module 230 may conduct interactive communications with the user either with or without the use of an agent. The messaging module 230 may leverage one or more delivery or messaging services such as email services, instant messaging services, short message services, and enhanced messaging services.

The PBX module 240 connects a private phone network to the public switched telephone network (PSTN) or the like. The response manager 210 may direct the PBX module 240 to connect a line on the private phone network with a number on the PSTN or internet. The termination hardware 250 routes calls from a local network to the public switched telephone network (PSTN). In one embodiment, the termination hardware 250 interfaces to conventional phone terminals. The response manager 210 may use the PBX module 240 or the termination hardware 250 to connect a user to an agent.

The response manager 210 may include an automatic number identification (ANI) module 212 that identifies session-specific telephone numbers that were called by users. The response manager 210 may also include a response address or response code manager 214 that identifies session-specific responses addresses or codes used by users when communicating to the system 100 or the like. In certain embodiments, the session-specific telephone number, response addresses, and response codes may be returned by the modules 212 and 214 to an available pool of numbers, addresses, and codes when communications with a user are completed.

Figure 3:
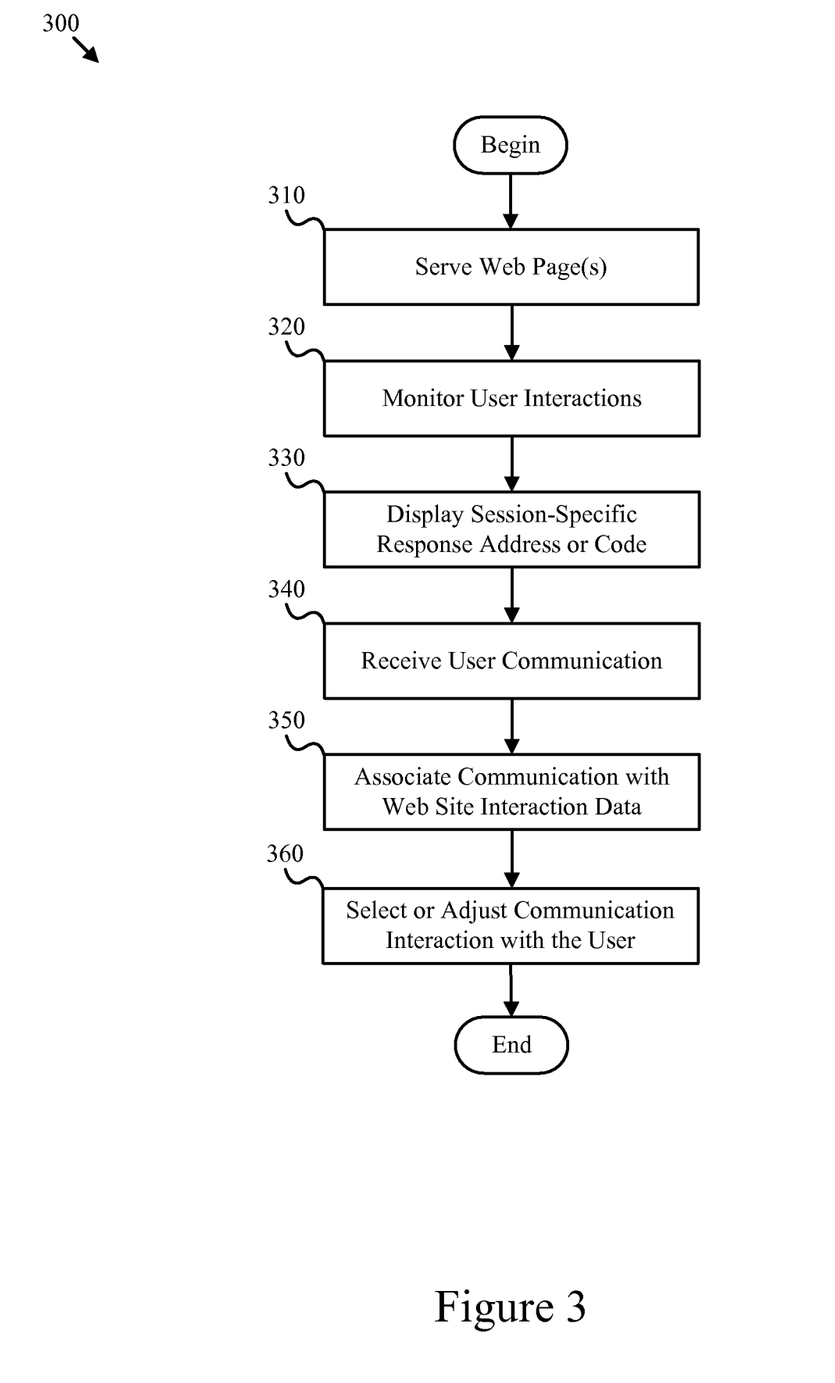
FIG. 3 is a schematic flow chart diagram illustrating one embodiment of a communication response method in accordance with the present invention.

FIG. 3 is a schematic flow chart diagram illustrating one embodiment of a communication response method 300 in accordance with the present invention. As depicted, the communication response method 300 includes providing 310 one or more web pages, monitoring 320 user interactions on the web pages, displaying 330 a session-specific response address or code, receiving 340 a communication from a user, associating 350 the communication with web site interaction data for the user, and adjusting 360 communication interaction with the user. The communication response method 300 improves responses to user communications.

Providing 310 one or more web pages may include serving web pages related to an enterprise such as information pages, product pages, customer support pages, event pages, and contact pages. Monitoring 320 user interactions on the web pages may include collecting data as to which pages and elements of the web pages the user interacts with. In one embodiment, user interactions are collected for the pages served by an enterprise as well as related pages such a competitor pages. The user interactions may be collected for a current browsing session and/or accumulated across multiple browsing sessions. In certain embodiments, the user interactions are collected by a third party service.

Displaying 330 a session-specific response address or code may include inserting a response address or code on a web page served to a particular user. Examples of a response address include an email address, a text-messaging address, an instant messaging address, and a telephone number. The response code may correspond to a session identifier. The response address or code may be session-specific in order to facilitate identification of a user that is communicating in response to a browsing session. The use of a session-specific response address or code enables identification of users while using a limited number of response addresses or codes. In certain embodiments, the response addresses or codes may be limited to a maximum number of anticipated browsers.

The depicted method continues by receiving 340 a communication from a user. The communication may be received via the session-specific response address provided to the user. In one embodiment, the session-specific response address is a telephone number. Associating 350 the communication with web site interaction data for the user enables selecting or adjusting 360 communication interaction with the user according to user interests or needs as captured by the web site interaction data. Examples of communication interaction that may be selected or adjusted include routing the communication, selecting a response message, providing a greeting, selecting an ACD plan, selecting an IVR menu, offering a product, offering a service, and conducting a survey.

In addition to associating communication with web site interaction data the method 300 may retrieve additional user data from a variety of sources that could enable improved selection of a response plan and/or improved success rates for achieving a particular purpose when responding to a user. Examples of additional data include additional web analytics data, reverse lookup data, credit check data, do-not-call registry data, data from a CRM database, and background check data.

In certain embodiments, the system 100 and method 300 may select a preferred response plan that directs responses to user communications and facilitates interactions that are known to improve user experiences and success rates. In one embodiment, selecting a preferred response plan includes correlating the web site interaction data and additional user data with statistical data associated with a variety of response plans and selecting the response plan with the highest correlation as the preferred response plan.

The preferred response plan may include a queuing strategy for handling communications with the user. For example, the queuing strategy may select an agent based on the demographic data of the user and the location of the user. Implementing a queuing strategy may improve response success rates.

In certain embodiments, communication interaction with the user includes presenting information regarding the user to an agent. The information may be visually or sonically presented. The information may include analytics information that indicates potential needs and interests of the user. The information presented to the agent may be delivered using a variety of delivery services such as email services, instant messaging services, short message services, enhanced messaging services, text messaging services, telephony-based text-to-speech services, and multimedia delivery services. In certain embodiments, additional interaction data that is manually or automatically collected during the user communications is provided to an analytics service or server. Providing such additional interaction data may improve the usefulness of the analytics data and associated service.

Figure 4:
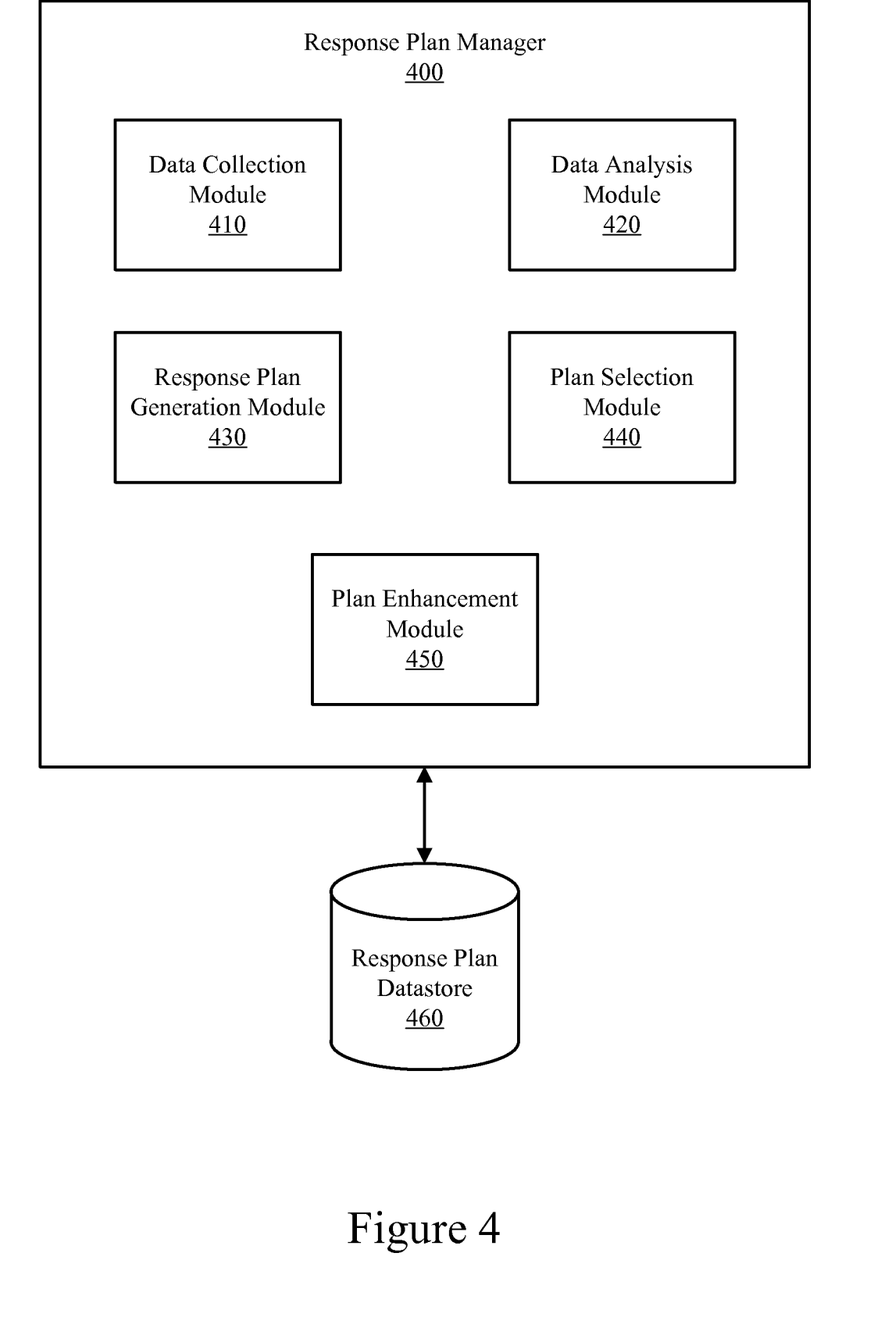
FIG. 4 is a schematic block diagram illustrating one embodiment of a response plan manager in accordance with the present invention.

FIG. 4 is a schematic block diagram illustrating one embodiment of a response plan manager 400 in accordance with the present invention. As depicted, the response plan manager includes a data collection module 410, a data analysis module 420, a response plan generation module 430, a plan selection module 440, and a plan enhancement module 440. The response plan manager facilitates generation and selection of a preferred response plan for responding to user communications.

The data collection module 410 may aggregate response records or other data corresponding to responses to user communications. The response records or other data may include information that specifies the time, manner, and outcome of the responses as well as user information and web site interaction information. The data analysis module 420 may analyze the response records to find correlations between the response outcome information and other information such as the time information, user information, web site interaction information, and response method information.

The response plan generation module 430 may receive the correlations and formulate a variety of response plans that reflect the statistical correlations between outcomes and the other information contained in the response records. In one embodiment, users with correlated data may be assigned to a group and a response plan is generated for that group along with mean and variance information for specific information fields that may be used to correlate and compare other users with the group.

The plan selection module 440 may receive web site interaction data for a particular user, correlate the data with statistical data associated with a number of available response plans and select a preferred response plan from the available response plans. A response plan datastore 460 may store the response plans and data associated with the response plans such as statistical data.

The plan enhancement module 450 may receive and analyze additional response records including associated customer data and determine if adjustments to the response plans may result in enhanced performance for the response system 100 or the like. In certain embodiments, the plan enhancement module 450 may randomize a response plan to increase response success, and/or partition the response plans into parts and combine the parts to create hybrid response plans. For example, the response plans may be partitioned into response methods and response purpose, each of which may be correlated to specific attributes from response records to create multiple subplans for various response methods and response purposes. The subplans for various response methods and response purposes may then be combined into a number of hybrid plans that each meet the needs of specific populations. One of skill in the art will appreciate that other forms of optimization not disclosed herein that are familiar to those of skill in the art may be conducted by the plan enhancement module 450.

Figure 5:
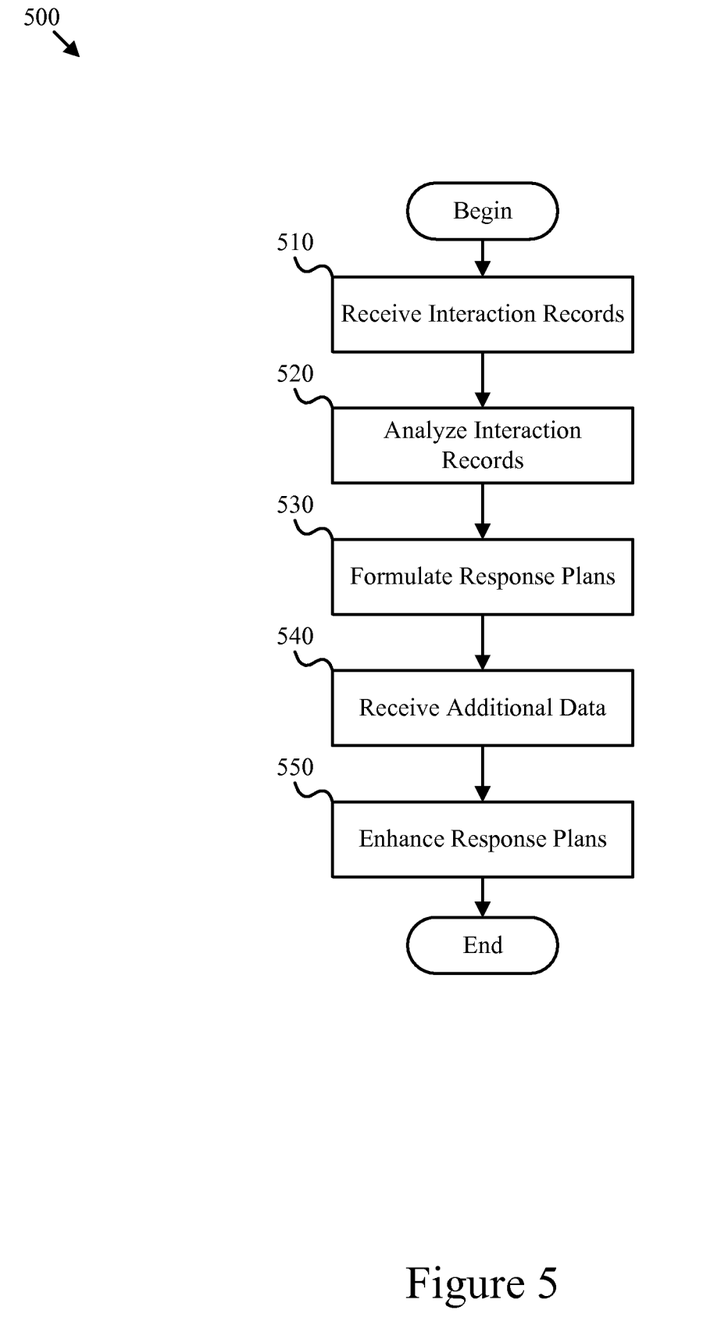
FIG. 5 is a schematic flow chart diagram illustrating one embodiment of a response plan generation method in accordance with the present invention.

FIG. 5 is a schematic flow chart diagram illustrating one embodiment of a response plan generation method 500 in accordance with the present invention. As depicted, the response plan generation method 500 includes receiving 510 response records, analyzing 520 the response records, formulating 530 one or more response plans, receiving 540 additional data, and enhancing 550 the response plans.

Receiving 510 response records may include receiving response records corresponding to responses for one or more web forms. In certain embodiments, the response records include time information, user information, web site interaction information, response method information, and outcome information.

Analyzing 520 the response records may include finding correlations between the outcome information and the time information, user information, and response method information. Formulating 530 one or more response plans may include using the correlations to formulate a set of response plans intended to improve contact successes.

The method 500 may also include analyzing 540 additional response records and enhancing 550 the response plans. In certain embodiments, enhancing 550 includes randomizing response plans and/or partitioning the response plans to facilitate hybridization. In one embodiment, enhancing 550 includes detecting if a response plan is yielding substantially inferior results to a default plan, scrapping the plan if the results are substantially inferior to the default plan, and building a new response plan to replace the inferior response plan. The default plan may be a response plan that is used if little information is known about a user.

Figure 6:
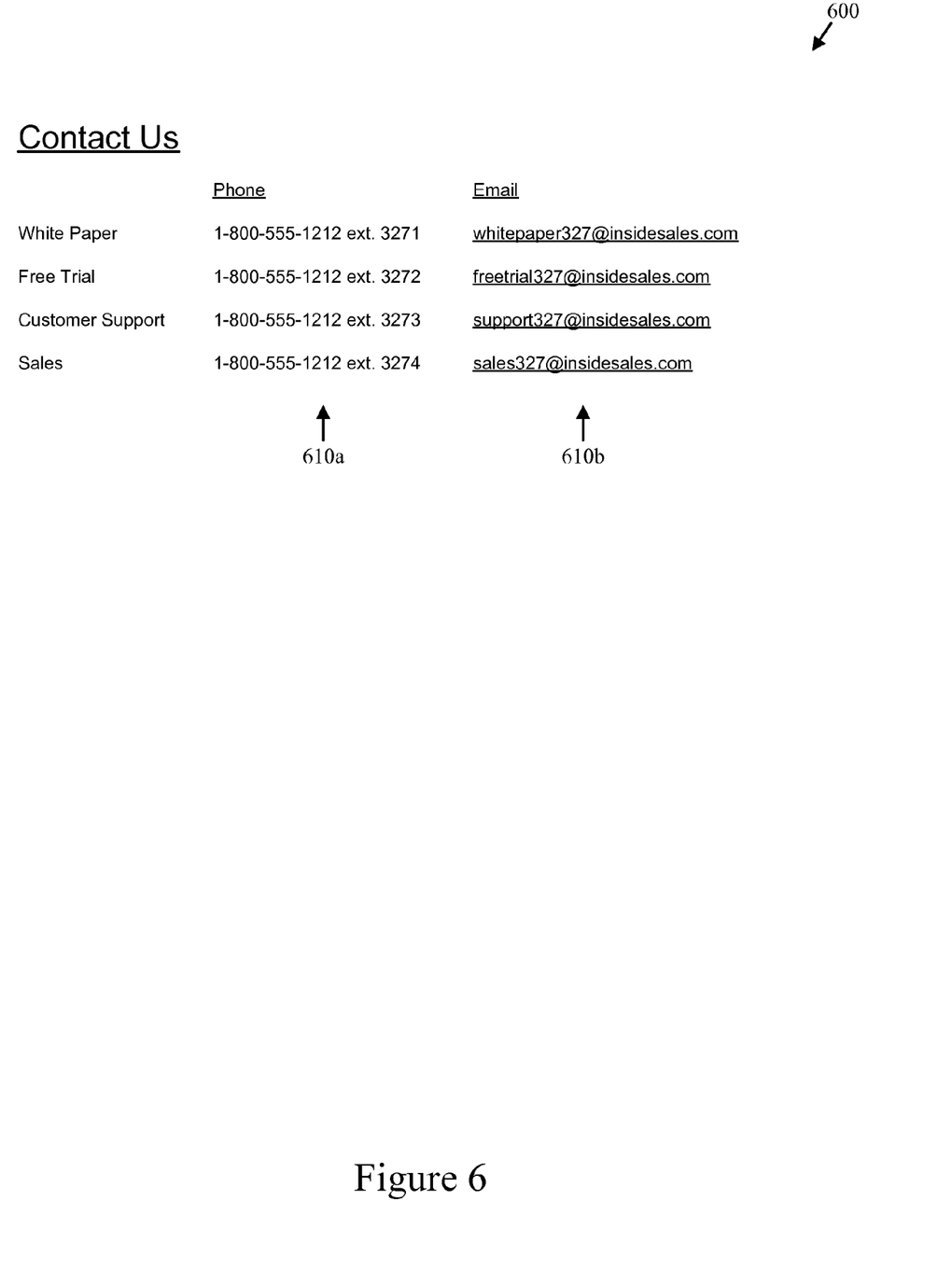
FIG. 6 is a text diagram illustrating one embodiment of a response address dialog in accordance with the present invention.

FIG. 6 is a text diagram illustrating one embodiment of a response address dialog 600 in accordance with the present invention. As depicted, the response address dialog 600 includes various session-specific response addresses 610 including a variety of telephone addresses or numbers 610*a* and a variety of email addresses 610*b*. In the depicted embodiment, a current browsing session identifier of '327' is embedded within each response address 610. The session-specific response addresses 610 enables an enterprise to provide customized responses to user communications. In the depicted embodiment, the response addresses 610 are service-specific as well as session-specific. Using response addresses that are service-specific as well as session-specific enables an enterprise to provide highly customized responses to user communications with a limited number of response addresses or codes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An interaction system for associating a limited number of telephone numbers within a limited number of possible numbers within a public addressing scheme with users interacting with a website, the limited number of telephone numbers being preselected from an entity managing a public telephone system, the public telephone system supplying a means whereby members of the public can call and communicate audibly with receiving others, the public telephone system using telephone numbers as a means of specifying a destination for placement of those calls, said interaction system comprising:

a web server configured to interact with users over a network;

a memory readable by said web server, said memory containing a pool of preselected telephone numbers, said preselected telephone numbers being secured within a public telephonic communications system, each preselected telephone number conforming to a public telephonic addressing scheme allowing for specifying the destination of a call by a calling party; and a communication server configured to receive incoming calls from outside persons at one or more of the preselected telephone numbers contained within said memory;

wherein said web server is configured to provide web pages to individual users in browsing sessions, whereby the providing of web pages to individual users is made in the context of a browsing session maintaining a history as to which pages and elements of web pages were served to particular users, that history not necessarily containing any further identifying information other than that needed to separate browsing sessions;

wherein said web server is further configured to select a telephone number from said pool of preselected telephone numbers conforming to the public telephonic addressing scheme allowing for specifying the destination of a call by a calling party from said memory, and associate the telephone number selected from said pool to a browsing session;

wherein said web server is further configured to serve customized web pages within a browsing session to which a telephone number within said pool contained within said memory and conforming to the public addressing scheme has been associated, each customized web page containing the associated number;

wherein said web server is further configured to maintain web site interaction data within the context of a browsing session to which a telephone number conforming to the public addressing scheme has been associated, and provide that interaction data using the associated telephone number as a reference;

wherein said communication server is further configured to have the telephone number used by an outside person in placement of a call through the public telephonic communications system;

wherein said communication server is further configured to receive web site interaction data;

wherein said communication server is further configured to associate received web site interaction data to a call using the telephone number conforming to the public addressing scheme of the call as a reference, and wherein said communication server is further configured to select or adjust a telephonic interaction with a person making a call based upon web site interaction data associated with the telephone number conforming to the public telephonic addressing scheme used to make the call.

2. The interaction system of claim 1, wherein said system is adapted to select or adjust a telephonic interaction that routes telephone calls according to the interests of an incoming caller.

3. The interaction system of claim 1, wherein said system is adapted to select or adjust a telephonic interaction that provides a greetings or other message adapted for the interest of a caller.

4. The interaction system of claim 1, wherein said system is adapted to select or adjust a telephonic interaction that selects a response message according to the interests of a caller.

5. The interaction system of claim 1, wherein said system is adapted to select or adjust a telephonic interaction that selects an ACD plan or IVR menu according to the interests of a caller.

6. The interaction system of claim 1, wherein said system is adapted to select or adjust a telephonic interaction that offers a product or service according to the interests of a caller.

7. The interaction system of claim 1, wherein said system is adapted to select or adjust a telephonic interaction that conducts a survey adapted for the interests of a caller.

8. The interaction system of claim 1, wherein said system includes a component that presents user-related data to agents, that user-related data originating from web site interaction data collected for an individual user.

9. An interaction system for associating a limited number of addresses within a public addressing scheme with users interacting with a website, the limited number of addresses being preselected from an entity managing a public communications system whereby members of the public can call and communicate audibly with receiving others, the limited number of addresses providing a means of specifying a destination for placement of those calls, said interaction system comprising:

a web server configured to interact with users over a network;

a memory readable by said web server, said memory containing a pool of preselected addresses, said preselected addresses being secured within a public communications system, each preselected address conforming to a public addressing scheme allowing for specifying the destination of a call by a calling party; and a communication server configured to receive incoming calls from outside persons at one or more of the preselected addresses contained within said memory;

wherein said web server is configured to provide web pages to individual users in browsing sessions, whereby the providing of web pages to individual users is made in the context of a browsing session maintaining a history as to which pages and elements of web pages were served to particular users, that history not necessarily containing any further identifying information other than that needed to separate browsing sessions;

wherein said web server is further configured to select an address from said pool of preselected addresses conforming to the public addressing scheme allowing for specifying the destination of a call by a calling party from said memory;

wherein said web server is further configured to associate to a browsing session an address conforming to the public addressing scheme selected from said preselected addresses from said memory;

wherein said web server is further configured to serve customized web pages within a browsing session to which an address within said pool contained within said memory and conforming to the public addressing scheme has been associated, each customized web page containing the associated address;

wherein said web server is further configured to maintain web site interaction data within the context of a browsing session to which an address conforming to the public addressing scheme has been associated, and provide that interaction data using the associated address as a reference;

wherein said communication server is further configured to have the address used by an outside person in placement of a call through the public communications system;

wherein said communication server is further configured to receive web site interaction data;

wherein said communication server is further configured to associate received web site interaction data to a call using the address of the call as a reference, and wherein said communication server is further configured to select or adjust a vocal interaction with a person making a call based upon web site interaction data associated with the address within the public addressing scheme used to make the call.

10. The interaction system of claim 9, wherein said system is adapted to select or adjust a telephonic interaction that routes telephone calls according to the interests of an incoming caller.

11. The interaction system of claim 9, wherein said system is adapted to select or adjust a telephonic interaction that provides a greetings or other message adapted for the interest of a caller.

12. The interaction system of claim 9, wherein said system is adapted to select or adjust a telephonic interaction that selects an ACD plan or IVR menu according to the interests of a caller.

13. The interaction system of claim 9, wherein said system is adapted to select or adjust a telephonic interaction that offers a product or service according to the interests of a caller.

14. The interaction system of claim 9, wherein said system is adapted to select or adjust a telephonic interaction that conducts a survey adapted for the interests of a caller.

15. The interaction system of claim 9, wherein said system includes a component that presents user-related data to agents, that user-related data originating from web site interaction data collected for an individual user.

16. A method for gathering information from a web browser session about the interests of a person, receiving calls through a public communications system from a preselected set of addresses within the public addressing scheme used by the public communications system, providing an identifying association between web browser sessions and incoming calls to the preselected addresses, and adjusting a vocal interaction with callers through an association of browser session to one of the preselected addresses, comprising the steps of:

securing a limited number of addresses within a public addressing scheme within a public communications system;

operating a communications server functional to receive audio calls from persons through the secured addresses;

operating a web server providing access to a web site;

from the web server, serving web pages in browsing sessions to individuals over a network, the browsing sessions maintaining a separate identity of individuals over other individuals interacting with the web server in their own browsing sessions, the identity not necessarily containing any further information other than that needed to separate browsing sessions;

upon creation of browsing sessions, selecting single addresses from the limited number of secured addresses;

pairing selected single addresses that are secured within the public addressing scheme with browsing sessions;

from the web server, serving customized web pages within browsing sessions to contain corresponding paired addresses within the public addressing scheme;

maintaining web site interaction data, that data formed or collected on the basis of which pages or elements of web pages were interacted with a user in the course of a browser session;

receiving calls at the communications server;

for received calls, identifying the address used by a caller to make the call;

associating maintained web site interaction data with a received call; and selecting or adjusting a vocal interaction with callers based upon both of a caller's identified address conforming with the public addressing scheme and the web site interaction data associated with the call, the vocal interaction being adapted for callers determined by their earlier individual interaction with the web site.

17. The method of claim 16, wherein the selection or adjustment of vocal interaction includes routing telephone calls according to the interests of callers.

18. The method of claim 16, wherein the selection or adjustment of vocal interaction includes providing greetings or other messages to users adapted for the interest of callers.

19. The method of claim 16, wherein the selection or adjustment of vocal interaction includes selecting response messages according to the interests of callers.

20. The method of claim 16, wherein the selection or adjustment of vocal interaction includes selecting ACD plans or IVR menus according to the interests of callers.

21. The method of claim 16, wherein the selection or adjustment of vocal interaction includes offering products or services according to the interests of callers.

22. The method of claim 16, wherein the selection or adjustment of vocal interaction includes conducting surveys adapted for the interests of callers.

23. The method of claim 16, further comprising the presentation of user related data to agents, that user related data originating from web site interaction data collected for individual users.

* * * * *